US 6,731,289 B1

(12) United States Patent
Peercy et al.

(10) Patent No.: US 6,731,289 B1
(45) Date of Patent: May 4, 2004

(54) EXTENDED RANGE PIXEL DISPLAY SYSTEM AND METHOD

(75) Inventors: Mark S. Peercy, Cupertino, CA (US); John M. Airey, Mountain View, CA (US); Andrew D. Bowen, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/569,654

(22) Filed: May 12, 2000

(51) Int. Cl.$^7$ .............................. G06F 15/16; G09G 5/00
(52) U.S. Cl. .......................... 345/503; 345/3.1; 345/5; 345/520
(58) Field of Search ........................... 345/1.1, 1.3, 3.1, 345/5, 501, 503, 506, 519, 520, 545, 77, 88, 89

(56) References Cited

U.S. PATENT DOCUMENTS

| | | | | |
|---|---|---|---|---|
| 4,970,500 A | * | 11/1990 | Hintze ..................... | 345/472.3 |
| 5,293,467 A | * | 3/1994 | Buchner et al. ............ | 345/422 |
| 5,528,741 A | * | 6/1996 | Lucas ....................... | 345/593 |
| 6,097,853 A | * | 8/2000 | Gu et al. ................... | 382/282 |
| 6,115,047 A | * | 9/2000 | Deering ..................... | 345/422 |
| 6,196,845 B1 | * | 3/2001 | Streid ....................... | 345/467 |
| 6,262,744 B1 | * | 7/2001 | Carrein ..................... | 345/604 |

OTHER PUBLICATIONS

Evans & Sutherland Publication, Display Systems, 1999 Evans & Sutherland Computer Corporation, Salt Lake City, UT.*
U.S. patent application Ser. No. 09/098,041, filed Jun. 16, 1998.

* cited by examiner

Primary Examiner—Ulka J. Chauhan
(74) Attorney, Agent, or Firm—Woodcock Washburn LLP

(57) ABSTRACT

One aspect of the invention is a method for displaying extended range pixel values. The method includes the step of receiving a plurality of image pixel values each with at least one associated data value. The method also includes the steps of sending at least one of the plurality of image pixel values to a first display device (94) having a maximum display value; and sending at least one of the plurality of image pixel values exceeding maximum display value to a second display device (98). In a further embodiment, the at least one associated data value may be at least one of the group consisting of a pixel intensity, a color, and a location of the pixel value.

19 Claims, 2 Drawing Sheets

EXTENDED RANGE PIXEL DISPLAY SYSTEM AND METHOD

BACKGROUND OF THE INVENTION

Graphics rendering and other visualization applications typically utilize accelerated hardware, firmware, and sometimes even software modules to perform compute-intensive rendering operations. These applications also utilize a graphics system interface such as OPENGL® or DIRECT3D® to control low-level graphics drawing operations in these accelerated modules. These operations include, but are not limited to, polygon specification and transformations, basic lighting control, and frame buffer operations such as blending and depth-buffering. Transformations usually correctly position one or more three-dimensional objects, and then applies lighting and/or textures using the correct size and angles. OPENGL® utilizes a variety of low-level models such as textures which may be defined for objects within scenes, and lighting models, which may define light sources and the manner in which surfaces in the scenes reflect light therefrom. Unfortunately, any increase in the quality of an object's appearance is typically associated with a decrease in processing speed. This decrease in processing speed is undesirable, especially for interactive applications.

Most graphics system processing utilizes fixed point pixel values at one or more points in the image pipeline. For example, pixel data values during rasterization and in a frame buffer are typically restricted to between zero and one. That is, these values are clamped with the use of graphics system interfaces such as OPENGL® or DIRECT3D®. This compression of pixel values may reduce the accuracy to which light and/or color may be displayed and/or processed. This compression of values typically limits the accuracy and flexibility with which the appearances of objects, such as their texture, may be represented. In many cases pixels may also be displayed using special calligraphic displays or projectors that typically provide dynamic range far above standard raster displays. That is, they may display pixels with an intensity that is hundreds or thousands of times brighter than those that may typically be displayed. These solutions typically use 'fudge factors' to force separation of pixels to be displayed using the calligraphic device and require additional modules. These modules utilize additional mechanical and electrical interfaces and, in some applications, require additional time, memory and processing resources to process the data. For example, current systems may utilize modules that receive as inputs those fractions of pixels that are touched as a result of passing a depth test to determine whether one or more "fuzzy" regions, rather than single points, are occluded.

SUMMARY OF THE INVENTION

From the foregoing, it may be appreciated that a need has arisen for streamlining the display of extended range pixel values from graphics pipelines. In accordance with the present invention, an extended range pixel display system and method are provided that substantially eliminate or reduce disadvantages and problems of conventional systems.

One aspect of the invention is a method for displaying extended range pixel values. The method includes the step of receiving a plurality of image pixel values each with at least one associated data value. The method also includes the steps of sending at least one of the plurality of image pixel values to a first display device having a maximum display value; and sending at least one of the plurality of image pixel values exceeding maximum display value to a second display device. In a further embodiment, the at least one associated data value may be at least one of the group consisting of a pixel intensity, a color, and a location of the pixel value.

The invention provides several important advantages. Various embodiments of the invention may have none, some, or all of these advantages. For example, the invention may be used to implement higher resolution values for operations such as texturing. Such an advantage may improve the quality of the resultant texture. The invention may be used with a variety of existing systems with low impact on the speed of processing.

The invention may reduce the number of components required as compared to conventional graphics display systems. For example, no additional calligraphic processor is needed to implement separation of these pixel values. The invention allows actual pixel values to be processed in the frame buffer, thereby improving the accuracy of pixel processing. A display driver may process and clamp these extended pixel values and identify values to be displayed using the calligraphic display device from those being displayed on a normal device.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE INVENTION

Figure 1:
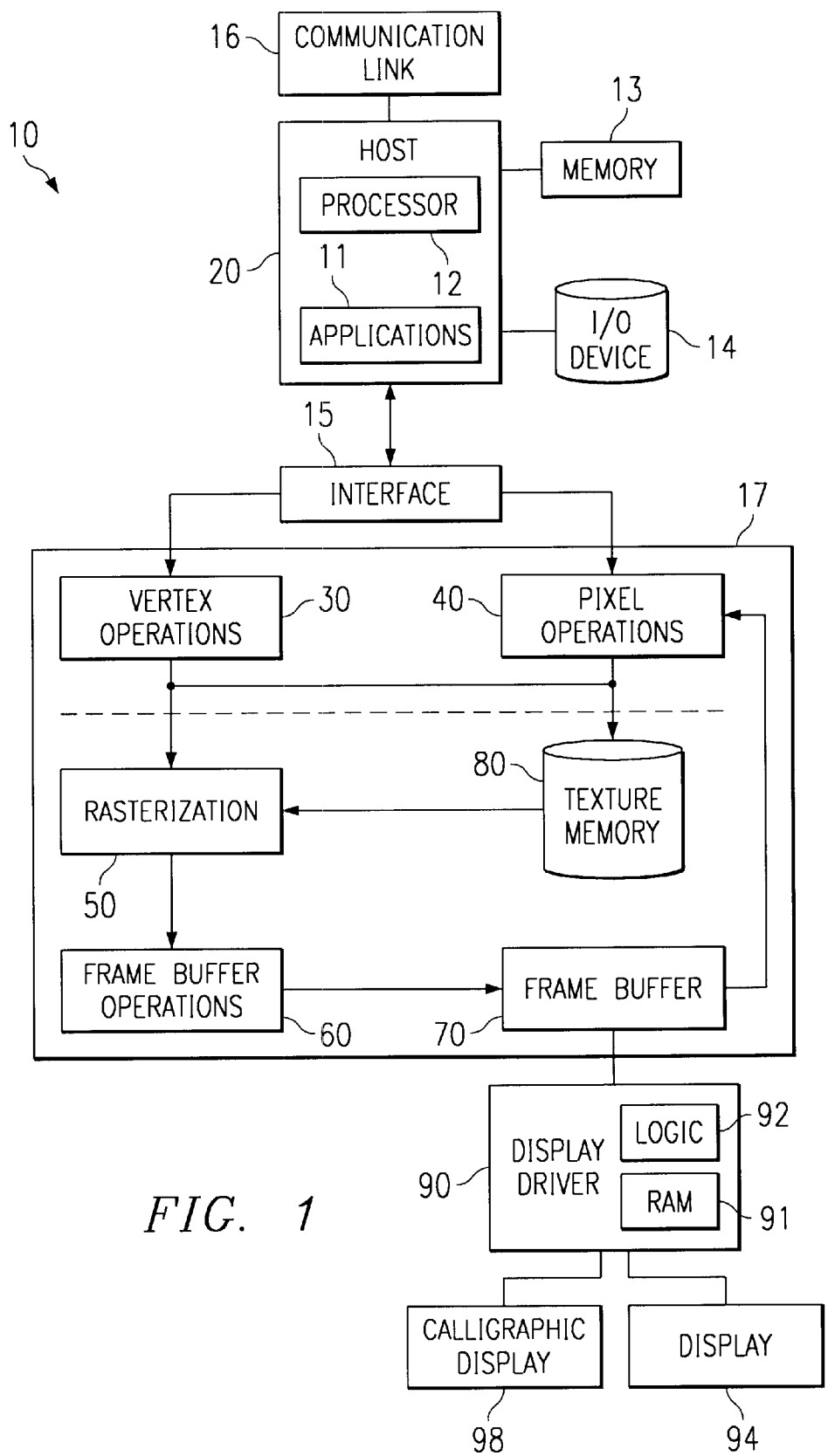
FIG. 1 is a block diagram of a graphics system.

FIG. 1 is a block diagram of a graphics system 10. Graphics system 10 includes a host 20 coupled to a graphics system interface 15 which couples to a graphics pipeline 17. Host 20 may be a general or a specific purpose computer and includes a processor 12 and a memory 13, which may include random access memory (RAM) and read only memory (ROM). Specifically, host 20 may be used to execute applications 11 having image graphics and visualization software that may be stored in memory 13 and/or an input/output device 14. Results may be displayed using display 90 and/or stored in input/output device 14, which may be any suitable storage medium. Data processing may be performed using special purpose digital circuitry contained either in host 20 or in a separate device. Such dedicated digital circuitry may include, for example, application-specific integrated circuitry (ASIC), state machines, fuzzy logic, as well as other conventional circuitry. Host 20 may also include a portion of a computer adapted to execute any of the well known MS-DOS, PC-DOS, OS2, UNIX, MAC-OS, and Windows operating systems or other operating systems including nonconventional operating systems. Host 20 may also be coupled to a communication link 16 that may be connected to a computer network, a telephone line, an antenna, a gateway, or any other type of communication link.

Interface 15 may be any software graphics or firmware interface such as OPENGL® or DIRECT3D® that includes procedures and functions and that may be used to control low-level operations in graphics pipeline 17. In operation, interface 15 is operable to control the processing of image data in graphics pipeline 17 in response to selected commands that are passed from application software 11 such as a programmable shader. Data is passed through some or all of the elements in graphics pipeline 17 and may then be transferred from frame buffer 70 to display 90 for viewing. For example, pixels may be written to and read from frame buffer 70 using OPENGL® function calls such as the DrawPixels and ReadPixels command, and the function CopyPixels can be used to copy a block of pixels from one region of frame buffer 70 to another.

More specifically, graphics pipeline 17 includes a vertex operations module 30 and a pixel operations module 40. Vertex operations module 30 and pixel operations module 40 are each coupled to a rasterization hardware 50. Rasterization hardware 50 is coupled to a frame buffer operations module 60, which in turn is coupled to a frame buffer 70. Frame buffer 70 may couple to pixel operations module 40. Pixel operations module 40 is also coupled to a texture memory 80, which is also coupled to rasterization hardware 50. Graphics pipeline 17 may include software, firmware, hardware, or a combination thereof. Interface 15 may be a standalone module, reside on host 20, or a combination thereof.

It may be helpful to illustrate a single pass through graphics pipeline 17. Because interfaces 15 such as OPENGL® are procedurally based, graphics pipeline 17 performs those low-level operations on all of the pixels passed in response to the OPENGL® procedure or function call. Host 20 sends image data to pixel operations module 40, which may utilize a lookup table to apply a scale or bias such as a color contrast or brightness to pixels passed thereto. Host 20 also sends geometry data to vertex operations module 30. The geometry data usually includes texture coordinates or vertices (s,t,r,q) that are projected points that correspond to a location (x,y,z,w) in an image plane. The geometry data may also include normals at each of these vertices for each of the three channels (usually red, green, and blue). Vertex operations module 30 transforms geometry into a raster coordinate system. Usually, this includes tessellation, or breaking down a continuously smooth surface into triangular surfaces. Rasterization hardware 50 usually interpolates the tessellated vertices to populate the pixels within each of these surfaces. In some applications, rasterization hardware 50 may also request a texture map from texture memory 80 which is then applied to all of the pixels in rasterization hardware 50. These pixels are then passed to frame buffer 70.

Frame buffer operations module 60 then may perform a variety of functions on the data passed from rasterization hardware 50 and then pass this data to frame buffer 70. Some of these functions include, but are not limited to, a depth test, stencil test, and blending, and are performed on all of the pixels passed to frame buffer operations module 60. A depth test typically discards portions of an image region that fail a depth comparison. For example, the depth test may be used to clip surfaces that are further from, or are obstructed by, an object that is nearer in a field of view. A stencil test may be used as an arbitrary comparison that allows selected pixels to be rejected based on the outcome of a comparison between the value in the stencil buffer and the reference value, usually an integer. Blending usually includes operations that may be performed on the pixels in the frame buffer, such as adds, subtracts, multiplies, or clears, and is typically used when assigning color values to pixels. An operation may be performed for each of the three color channels. When frame buffer 70 has performed this operation on all of the pixels, the pixels are usually sent to a display 90.

Where programmable applications 11 such as shading algorithms are used to model the appearance of objects, an artist typically describes the appearance of one or more portions of an image by selecting those pixels that should be altered. For example, a programmable shading algorithm may be used to provide various atmospheric, light, shading, surface details, textures, and/or colors. These functions may parameterize the appearance of selected objects.

These complex appearance effects typically result in different operations being performed on each resultant geometry-based vertex. One example may be a three-D lighting operation that models the diffuse reflection of colored, directional light sources from colored surfaces. Algorithms may use an illumination function that calculates the diffuse reflection of colored directional light for each vertex of a colored surface. For example, the illumination function for a single vertex is a vector dot product of the light source coordinates and the vertex normal, multiplied by the light color, the vertex material color, and the attenuation.

Application software 11 may reside on host 20 or may be a separate module. Any data upon which application software may operate, including scenes and any objects therein, may be referred to as image data. This image data may originate from memory in host 20 or in a separate storage medium (not explicitly shown). Application software 11 and image data residing on host 20 are used to illustrate one aspect of the invention. Interface 15 may couple host 20 to graphics pipeline 17 in some embodiments or couple a separate application program 11 to host 20 in others.

Application 11 may process one or more pixel-based portions of an image for a given geometry-based vertex by passing selected portions of image data through graphics pipeline 17 multiple times with different parameters. This allows interface 15 such as OPENGL® to be used as a single-instruction, multiple-data (SIMD) computing surface by using several basic OPENGL® functions in multi-pass operations that are called by application 11. One such function may include, for example, CopyTexImage which may be used to define a texture array from frame buffer 70. One such application 11 that may utilize interface 15 as a SIMD computing surface is one that utilizes the Renderman shading language.

Figure 2A:
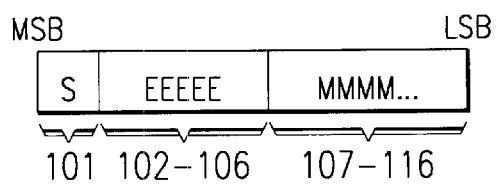
FIGS. 2A and 2B graphically illustrate examples of extended range pixel data.
Figure 2B:
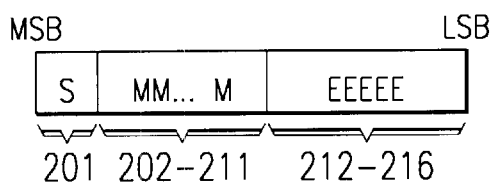

Bits of image pixel values may be preserved in this process to improve computational accuracy within graphics pipeline 17. For example, floating point values may be represented in at least a portion of graphics pipeline 17. One method for such representation is discussed in U.S. patent application Ser. No. 09/098,041, entitled "Display System Having Floating Point Rasterization and Floating Point Framebuffering", filed Jun. 16, 1998. Any number of bits may be used to represent these pixel values. For example, one method for representing pixel data values may use a signed floating point system with a plurality of bits that may be divided between a sign portion, a mantissa portion, and an exponent portion. Furthermore, the arrangement of the plurality of bits may vary as desired. Two examples are illustrated in FIGS. 2A and 2B and are used to illustrate one aspect of the information. These pixel values include ten mantissa bits and five exponent bits. Where the exponent portion is biased from values between −16 and +15, the pixel values may range between −64 K to +64 K. The invention contemplates fewer or more total bits, mantissa bits, and/or exponent bits, and other arrangements for sign, mantissa, and exponent bits that may be suitable for a desired application and/or implementation.

In operation, display driver 90 is operable to extract and/or otherwise receive these extended range pixel data from frame buffer 70. Because these values are not limited to a range between zero and one, these pixel values reflect a more accurate representation of the pixel value in frame buffer 70. Display driver 90 may receive, upon or without request, a plurality of pixels from frame buffer 70. In many applications, this plurality of pixels represents each horizontal line, or raster, to be displayed from frame buffer 70.

Display driver 90 is also operable to properly limit data that is to be displayed using calligraphic display 98 and display 94. That is, display driver 90 may perform clamping functions that are not being performed in this embodiment by interface 15. Display driver 90 is also operable to electronically split calligraphic information to be displayed using calligraphic display 98 from other video to be displayed using display 94. In addition, the calligraphic and video data are sent to calligraphic display 98 and display 94, respectively. One method for displaying this data is discussed in further detail in conjunction with FIG. 3.

Calligraphic display 98 may be any display or projector, such as a raster/calligraphic projector or a laser light projection system, with a dynamic range far above standard raster displays 94. That is, calligraphic display 98 is operable to display bright, high-resolution raster images enhanced with a plurality of calligraphic lightpoints in one or more modes. Calligraphic display 98 may also feature additional display functions such as digital correction and convergence, edge blending, raster scan and calligraphic deflection. These calligraphic lightpoints may be enhanced to intensities that may be hundreds or thousands of times brighter than video data. Calligraphic display 98 may also be operable to draw vector or polygon segments. Calligraphic display 98 and display 94 may each be separate, standalone modules, or seamlessly mosaicked or otherwise positioned so that the pixels within each display appear to be originating from a single projector.

Display driver 90 includes a memory such as RAM 91 and logic 92 that may be used to store selected pixel values and support data associated therewith. Display driver 90 may be implemented using a variety of methods in hardware, firmware, or software, or a combination thereof. In some applications, display driver 90 may include special purpose digital circuitry such as application-specific integrated circuitry (ASIC), state machines, fuzzy logic, etc. Display driver 90 may also reside anywhere in system 10. For example, display driver 90 may be a standalone module, or may be included as a portion of frame buffer 70, display 94, calligraphic display 98, host 20, or a combination thereof.

FIG. 2A graphically illustrates one example of an extended range pixel representation, where a pixel value may be represented by sixteen bits 101–116. Bits 101–116 range from a most significant bit (MSB) 101 to a least significant bit (LSB) 116. As illustrated in FIG. 2A, MSB 101 may be used as a sign bit. The next five most significant bits 102–106 may be used as exponent bits, and bits 107–116 may be used as mantissa bits.

FIG. 2B graphically illustrates another example of an extended range pixel representation, where a pixel value may be represented by sixteen bits 201–216. Bits 201–216 range from a most significant bit (MSB) 201 to a least significant bit (LSB) 216. As illustrated in FIG. 2B, MSB 201 may be used as a sign bit. In this embodiment, the next ten most significant bits 202–211 may be used as mantissa bits, and bits 212–216 may be used as exponent bits.

Figure 3:
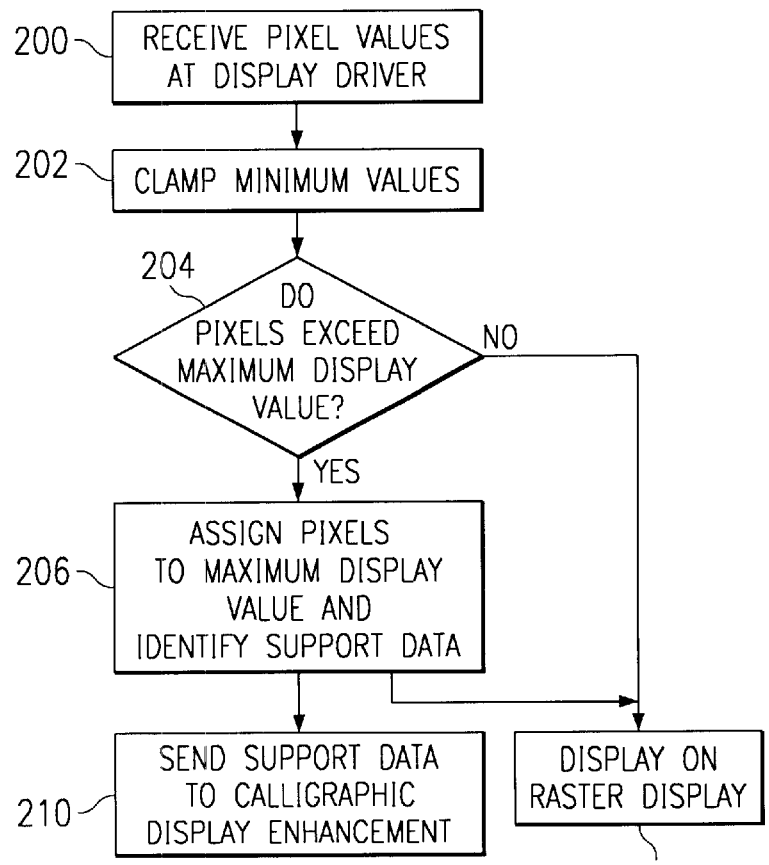
FIG. 3 is an example of a method for displaying extended range pixel data.

FIG. 3 is an example of a method for displaying extended range pixel data. Although steps 200–210 are illustrated as separate steps, various steps may be ordered in other logical or functional configurations, or may be performed as single steps. The method may allow for the processing of extended range pixel values in frame buffer 70 and may reduce the number of occurrences where pixel values may be clamped. Such an advantage may improve the accuracy of the processing in graphics pipeline 17 and the visual appearance of the processed image.

In step 200, display driver 90 first receives a plurality of extended range pixel values from frame buffer 70. A raster will be used to illustrate one aspect of the invention. Display driver 90 may store these values in a memory such as RAM 91, or process these values as they are received and store selected values. In step 202, display driver 90 then uses logic 92 to determine whether those floating point values are less than a selected minimum video display value. In one embodiment, the selected minimum video display value may be zero. Display driver 90 then assigns the minimum video display value to those values that are less than the selected minimum video display value. For example, any negative pixel values may be reassigned a value of zero.

The method continues in step 204, where display driver 90 determines whether those floating point values exceed a selected maximum video display value. In one embodiment, the selected maximum video display value may be one. If not, no pixel values need be displayed using calligraphic display 98. Thus, in step 208 display driver 90 then transfers the raster array to display 94.

If so, one or more pixel values will be displayed using calligraphic display 98. In step 206, display driver 90 identifies those values that exceed the selected maximum video display value from those that do not. Those values that exceed the selected maximum video display value are assigned to the maximum video display value and may be stored in memory such as RAM 11. Display driver 90 identifies these values as calligraphic light points, and may also store in the memory support data such as the number of these values, their locations, and their original intensities. Display driver 90 may use these values to enhance the calligraphic light points. This advantage reduces the occurrence of 'fuzzy regions' seen with existing systems. For example, pixels that are partially or totally occluded are desirably dimmed to provide a more pleasant visual appearance and to reduce or eliminate visual artifacts. Original intensities and/or corresponding locations may be used as a scale factor to dim those occluded pixel locations that may have failed a depth test in frame buffer 70.

Then, in step 208 display driver 90 transfers the raster array to display 94 and in step 210, display driver 90 transfers to calligraphic display 98 the support data associated with the maximum video display values. Calligraphic display 98 may use a variety of methods to enhance and/or brighten the calligraphic light points to an appropriate intensity with these support data.

Thus, it is apparent that there has been provided in accordance with the present invention an extended range pixel display system and method that satisfies the advantages set forth above. For example, the present invention allows the use of extended range pixel values with a graphics system interface such as OPENGL®. The invention also allows extended range pixel values to be displayed on both conventional raster displays and calligraphic displays without the need for processing of 'fudge factors'. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for displaying extended range pixel values, comprising:

receiving a plurality of image pixel values each with at least one associated data value, the plurality of image pixel values represented as floating point values that include a plurality of mantissa bits and a plurality of exponent bits;

sending at least one of the plurality of image pixel values not exceeding a maximum display value to a first display device having a limit of the maximum display value; and sending at least one of the plurality of image pixel values exceeding the maximum display value to a second display device that is capable of displaying image pixel values exceeding the maximum display value.

2. The method of claim 1, wherein the at least one associated data value includes at least one of the group consisting of a pixel intensity, a pixel color, and a location of the pixel value.

3. The method of claim 1, wherein the at least one of the plurality of image pixel values is retrieved from a memory.

4. The method of claim 3, wherein the memory is a frame buffer in a graphics pipeline.

5. The method of claim 1, further comprising storing the at least one associated data value in a second memory.

6. The method of claim 1, wherein the second display device is a calligraphic display.

7. A system for displaying extended range pixel values, comprising:

a graphics pipeline having a first memory that stores a plurality of image pixel values each with at least one associated data value; and a display driver having a second memory that stores at least one of the plurality of image pixel values, the display driver operable to receive the plurality of image pixel values, to store at least one of the plurality of image pixel values in the second memory, and to send at least one of the plurality of image pixel values not exceeding a maximum display value to a first display device having a limit of the maximum display value and to send at least one of the plurality of image pixel values exceeding the maximum display value to a second display device that is capable of displaying image pixel values exceeding the maximum display value.

8. The system of claim 7, wherein the at least one associated data value includes at least one of the group consisting of a pixel intensity, a pixel color, and a location of the pixel value.

9. The system of claim 7, wherein the at least one of the plurality of image pixel values is represented as a floating point value that includes a sign bit, a plurality of mantissa bits, and a plurality of exponent bits.

10. The system of claim 7, wherein the display driver is implemented in at least a portion of an application-specific integrated circuit.

11. The system of claim 7, wherein the second memory comprises a random access memory.

12. The system of claim 11, wherein the first memory includes a frame buffer in a graphics pipeline.

13. The system of claim 7, wherein the second display device is a calligraphic display.

14. An extended range pixel value display driver, comprising:

a first memory operable to receive from a graphics pipeline having a second memory, a plurality of image pixel values each with at least one associated data value; and logic coupled to the first memory and operable to send at least one of the plurality of image pixel values not exceeding a maximum display value to a first display device having a limit of the maximum display value and to send at least one of the plurality of image pixel values exceeding the maximum display value to a second display device that is capable of displaying image pixel values exceeding the maximum display value.

15. The display driver of claim 14, wherein the second display device is a calligraphic display.

16. The display driver of claim 14, wherein the at least one of the plurality of image pixel values is represented as a floating point value that includes a sign bit, a plurality of mantissa bits, and a plurality of exponent bits.

17. The display driver of claim 14, wherein the logic is implemented in at least a portion of an application-specific integrated circuit.

18. The display driver of claim 14, wherein the at least one associated data value includes at least one of the group consisting of a pixel intensity, a pixel color, and a location of the pixel value.

19. The display driver of claim 14, wherein the first memory is a random access memory.

* * * * *